Aug. 1, 1939.  R. BISCHOFF  2,168,254
VALVE
Filed Dec. 18, 1935  2 Sheets-Sheet 2

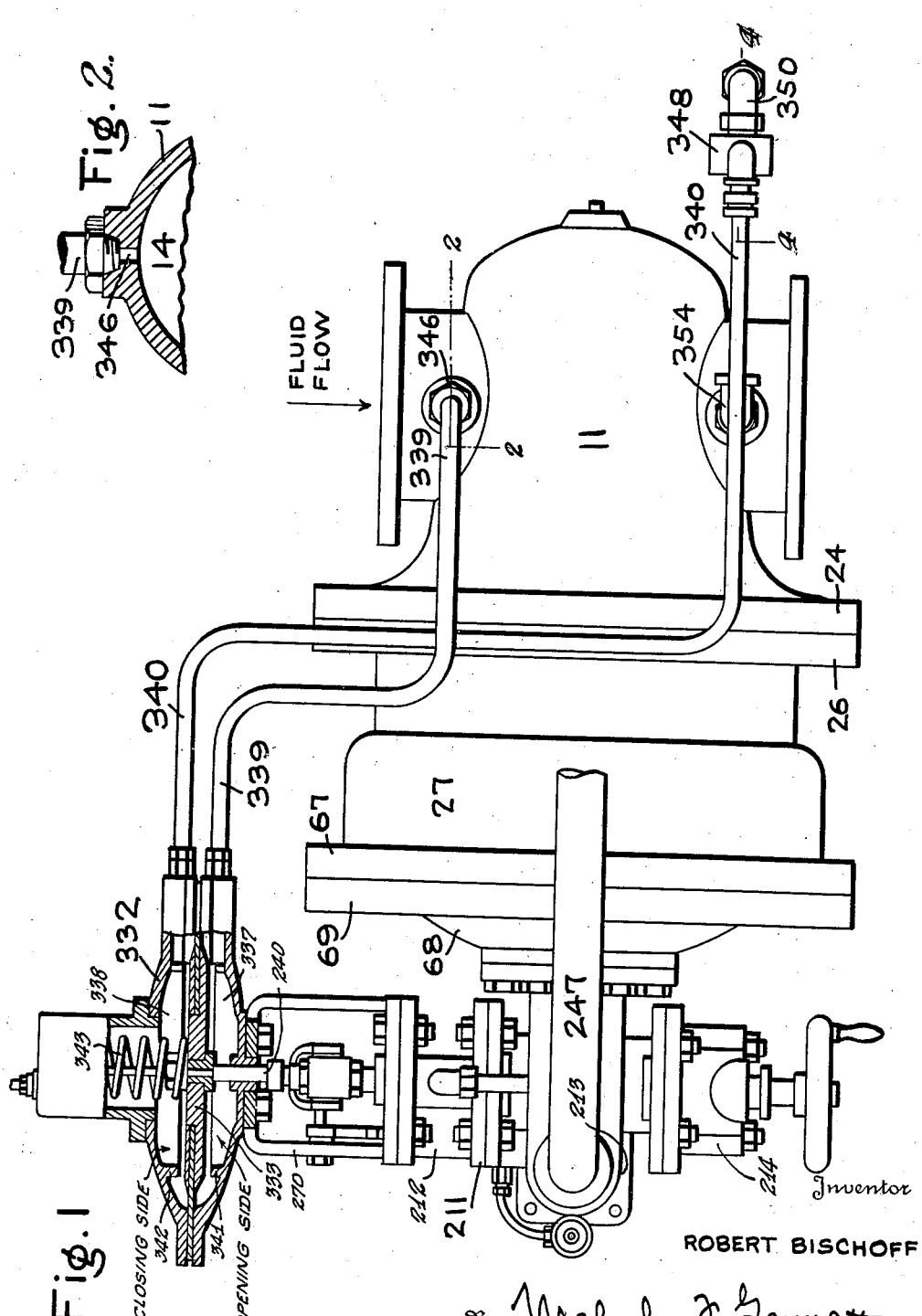

Inventor
ROBERT BISCHOFF
By Malcolm F. Gannett
Attorney

Patented Aug. 1, 1939

2,168,254

UNITED STATES PATENT OFFICE 2,168,254

VALVE

Robert Bischoff, York, Pa., assignor to S. Morgan Smith Company, York, Pa., a corporation of Pennsylvania Application December 18, 1935, Serial No. 54,998

4 Claims. (Cl. 137—153)

This invention relates to valves of the type adapted to be automatically operated to control the flow of fluid in a conduit.

An improved fluid pressure operated cone type of plug valve is shown in United States Letters Patent No. 2,078,231, granted April 27, 1937, on an application filed by Eugene C. Brisbane. The present invention relates more particularly to automatic control mechanism for a valve of the Brisbane type.

An object of the invention is to provide an improved control mechanism for the operating means of a valve which is responsive to fluid flow conditions in the conduit in which the valve is installed.

Another object of the invention is to provide an improved mechanism of the above type, in which the control for the power operated means of the valve includes a fluid pressure actuated member having a valve opening pressure chamber at one side thereof and a valve closing pressure chamber at the other side thereof, the valve opening pressure chamber being subject to the pressure of fluid in the conduit in which the valve is installed at the upstream side of the valve, and the valve closing pressure chamber being connected to the throat of a Venturi passage through which fluid flowing in the conduit is adapted to pass.

Another object of the invention is to provide an improved valve control mechanism of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:

Figure 1 is a plan, partly in horizontal section, of a valve having a fluid pressure actuated control mechanism constructed according to the present invention;

Fig. 2 is a detail section taken on the line 2—2 of Fig. 1 showing the piezometer connection of one of the pipes leading to the fluid pressure actuated mechanism;

Figure 3:
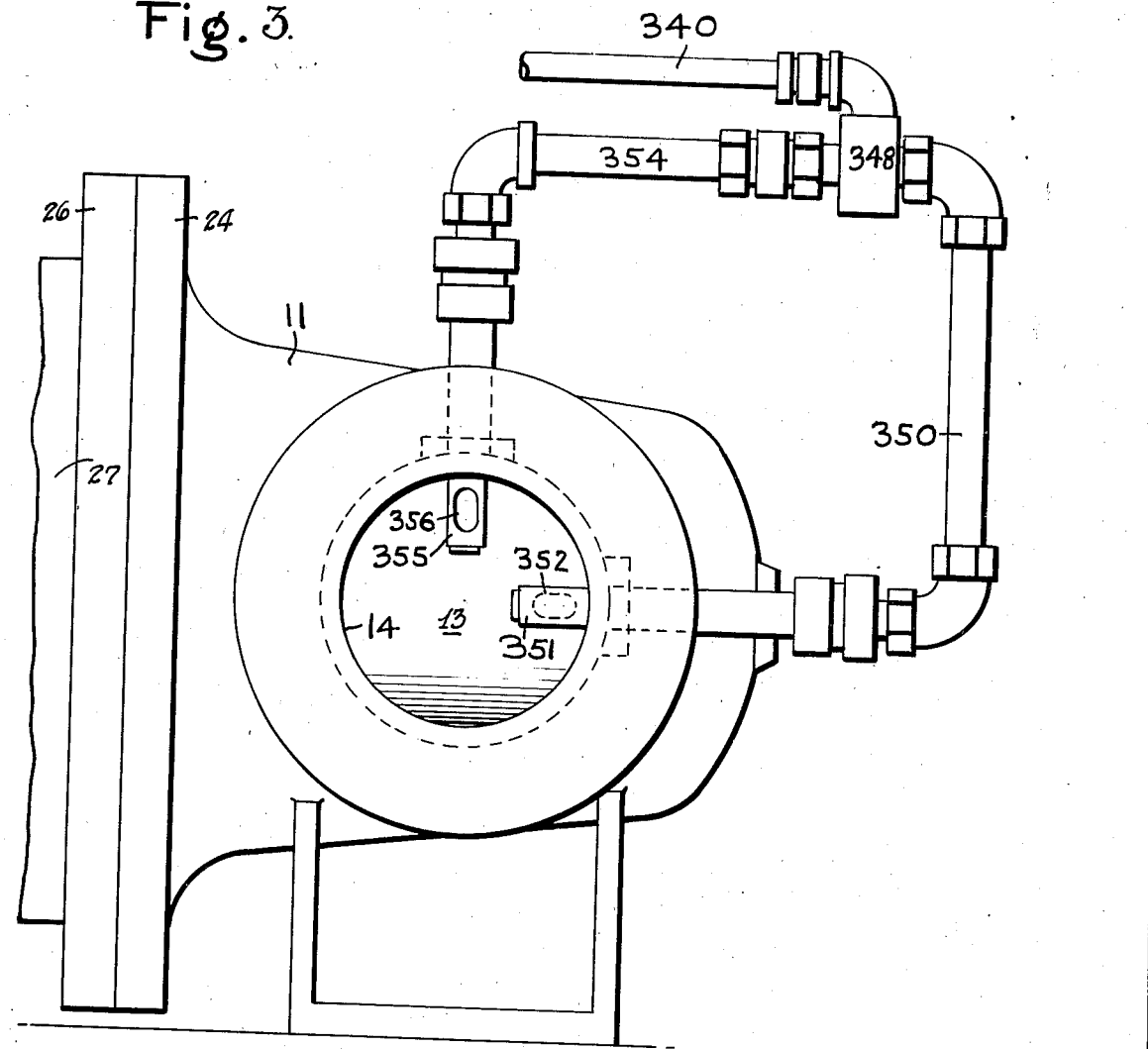
Fig. 3 is an enlarged elevation of a portion of the structure shown in Fig. 1, showing the flow tubes and associated parts.

Only so much of the construction and operation of the main valve and its operating mechanism is herein shown and described as is deemed necessary for a clear understanding of the operation of the control mechanism of the present invention. The main valve is fully shown and described in the above mentioned Brisbane Patent No. 2,078,231. The control valve for the operating mechanism of the Brisbane valve is shown and described in detail in a divisional application, Serial No. 260,906, filed March 10, 1939.

Referring to the drawings, the improved valve 10 comprises a main valve body or casing 11, in which is mounted the usual plug 13, adapted to control communication through the opening or waterway 14 which constitutes a passage through the valve in the usual manner.

The valve body 11 is preferably constructed from a single casting having a tapered side wall. The larger end of the valve body is formed with an outwardly projecting flange 24 which has secured thereto by any suitable means, a correspondingly formed flange 26 of the housing 27 of the operating mechanism of the valve.

The outer end of the housing 27 is formed with an outwardly projecting flange 67.

A cover 68, having a flange 69 engaging the flange 67 of the housing 27, is detachably secured to said housing by any suitable means. The cover 68 is dome-shaped, as shown in Fig. 1.

A control valve device 211 for the valve operating mechanism is supported from the cover 68.

The control valve 211 is formed of three sections 212, 213 and 214, said sections being suitably bolted together. The intermediate section 213 constitutes the main body of the control valve.

Connected to section 213 is one end of a pipe 247 which leads from a suitable source of fluid under pressure.

Connected to the section 212 is a bracket 270. This bracket supports a fluid pressure operated actuating means for the control valve 211, such as a diaphragm device 332, the valve stem 240 of the control valve 212 being connected to the diaphragm of the device 332 in well known manner.

The construction and operation of the control valve device 211 is shown and described in my pending application Serial No. 260,906 referred to heretofore.

The diaphragm device 332 may be of any approved construction and chambers 337, 338 on opposite sides of the diaphragm 333 are adapted to be connected to a suitable source of fluid under pressure by means of pipes 339, 340, which lead, respectively, from said chambers. The movement of the diaphragm 333 is limited by stops 341 and 342 formed in the casing of the diaphragm device on opposite sides of said diaphragm.

The pipes 339 and 340 may be operatively connected to the conduit in which the main valve is installed so that the fluid under pressure in the conduit can be utilized for operating the diaphragm device 332.

In the present instance, one end of the pipe 339 is shown terminating at a piezometer on one side of the valve (see Fig. 2).

Figure 4:
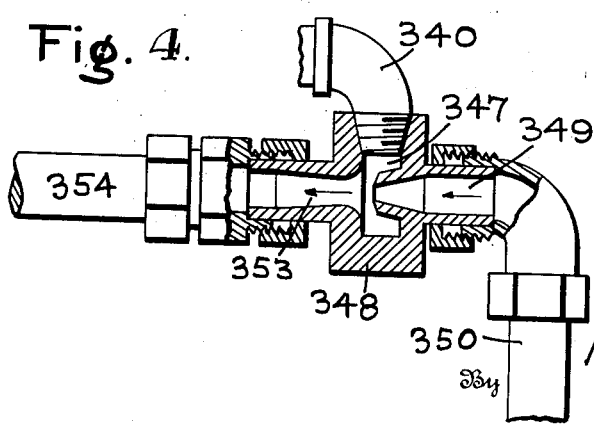
Fig. 4 is an enlarged section taken on the line 4—4 of Fig. 1.

On the other hand, pipe 340 leads from the diaphragm device 332 to a chamber 347 of a venturi or ejector 348 (see Fig. 4).

Projecting into the chamber 347 is a tapered or conical tube 349, the outer end of which is connected to a pipe 350.

The other end of the pipe 350 terminates as shown at 351, in the waterway 14 of the valve on the side of the plug 13 opposite to the side having the piezometer 346 (see Figs. 1 and 3).

Flow through the valve from a pump or blower (not shown) is in the direction indicated by the arrow, Fig. 1, and the pipe 350 has an opening 352 disposed so as to intercept the fluid flowing through the valve when the pump or blower is operating as is well known in the art.

Leading from the chamber 347 and disposed axially with respect to the tube 349, is a second tapered or conical tube 353, the outer end of which is connected to a pipe 354.

The other end of the pipe 354 terminates, as shown at 355, in the waterway 14 of the main valve on the same side of the plug 13 as is the end 351 of the pipe 350 heretofore referred to. However, the opening 356 in the end of the pipe 355 is disposed, as shown in Fig. 3, in the opposite direction or downstream with respect to the disposition of the opening 352. The pipes 350 and 354 constitute flow tubes.

As shown in Fig. 4, the smaller or inner end of the tapered tube 353 of the ejector is flared outwardly, and this inner end of the tube is disposed in suitable spaced relation with the inner or smaller end of the tube 349. The tube 349 projects into the chamber 347 a suitable distance to provide a throat having a restricted area.

When the main valve 11 is installed in a conduit leading from a pump or blower, the valve may function as a check valve so as to automatically cut off communication through the conduit when the pump or blower shuts down. In such installations the piezometer 346 is connected to the opening side of the diaphragm 333, and the closing side of said diaphragm is connected to the ejector device 348 by the pipe 340, as has been described.

Assuming that the main valve 11 is closed and the pump or blower is started up, pressure is developed on the pump side of the valve slightly in excess of the static pressure on the opposite side of the closed plug 13. This pump pressure is transmitted to the diaphragm chamber 337, through the piezometer 346 and the pipe 339, and the diaphragm 333 moves to open position, since the fluid pressure thus built up in the chamber 337 exceeds the combined pressure of fluid in the diaphragm chamber 338, plus the pressure of the spring 343.

Movement of the diaphragm 333 to open position effects opening of the main valve plug 13 through the action of the control valve device 211.

As soon as the plug 13 starts to open, flow is created through the waterway 14 of the valve 11, and, therefore, a flow is also created through the flow pipes 350 and 354 and the ejector device 348.

Due to the fact that the throat area in the ejector 348 is smaller than the area of the flow pipes 350 and 354, the velocity through the throat of the ejector is in excess of the velocity in the flow tubes 350 and 354 and this excess velocity produces a static pressure at the throat which is lower than the pressure in the main valve waterway 14 or in the flow tubes 350 and 354.

As heretofore mentioned, the ejector chamber 347 is connected to the closing side of the diaphragm 333 (chamber 338), and, therefore, the reduced static pressure at the throat of the ejector is transmitted to the diaphragm chamber 338 through the pipe 340, so that the pressure of fluid in the chamber 338 remains lower than the pressure of fluid in the chamber 337 and the diaphragm 333 is held seated against the seat 342 as long as the valve plug 13 is open and there is flow through the waterway 14 in the direction of the arrow, Fig. 1.

It should be noted that the tension of the spring 342 is adjusted to exert a force slightly lower than the resultant force of the lower pressure on the area of the diaphragm 333, and the combined functions of the piezometer 346 and the flow tubes 350 and 354, hereinabove described, result in maintaining the diaphragm in open position, and consequently the main valve plug 13 in open position, until such time as velocity through the waterway 14 ceases and the ejector device 348 becomes ineffective, due to lack of velocity. For instance, when the pump or blower ceases to operate, and, therefore, flow through the conduit in which the main valve 11 is installed ceases, since the flow of fluid through the ejector device 348 will also cease, the static pressure in chamber 347 will correspondingly increase and such increase in fluid pressure will be conducted to the diaphragm chamber 338 so that the pressure on both sides of the diaphragm 333 becomes equal. The force of the spring 343 acting on one side of the diaphragm 333 will then move the diaphragm to its closed position against the seat 341, and this action results in the main valve plug 13 being moved to its closed position through the action of the control valve devices 211. In the drawings the diaphragm 333 is shown in its normal balanced position.

Having thus described my invention, what I claim is:

1. The combination with a fluid conduit having a main valve therein for opening and closing said conduit and power operated means for operating said valve, of automatic control mechanism for said power means responsive to fluid flow conditions in said conduit, comprising a fluid pressure actuated member having a valve opening pressure chamber at one side thereof and a valve closing pressure chamber at the other side thereof, a Venturi passage through which fluid flowing in said conduit is adapted to pass means for inducing a flow through said venturi from the flow through said conduit, means communicating the pressure in said conduit at the upstream side of said main valve to the valve opening pressure chamber, and a connection for communicating the pressure at the throat of said venturi to said valve closing pressure chamber.

2. The combination with a fluid conduit having a main valve therein for opening and closing said conduit and power operated means for operating said valve, of automatic control mechanism for said power means responsive to fluid flow conditions in said conduit, comprising a fluid pressure actuated member having a valve opening pressure chamber at one side thereof and a valve closing pressure chamber at the other side thereof, a pipe leading out from and back into said conduit at the downstream side of the valve and having intermediate its ends a venturi through which fluid flowing in said conduit is adapted to pass, said pipe having at its ends oppositely facing Pitot tubes the mouths of which face into and with the flow of fluid in the conduit, means for communicating the pressure in said conduit at the upstream side of said main valve to the valve opening pressure chamber and a connection between the throat of the venturi and said valve closing pressure chamber.

3. The combination with a fluid conduit having a main valve therein for opening and closing said conduit and power operated means for operating said valve, of automatic control mechanism for said power means responsive to fluid flow conditions in said conduit, comprising a fluid pressure actuated member having a valve opening pressure chamber at one side thereof and a valve closing pressure chamber at the other side thereof, a venturi through which fluid flowing in said conduit is adapted to pass, means for inducing a flow through said venturi from the flow through said conduit, means communicating the pressure in said conduit at the upstream side of said main valve to the valve opening pressure chamber, and a connection for communicating the pressure at the throat of said venturi to said valve closing pressure chamber, the intake and discharge from said venturi being located at the downstream side of the main valve.

4. The combination with a fluid conduit having a main valve therein for opening and closing said conduit and power operated means for operating said valve, of automatic control mechanism for said power means responsive to fluid flow conditions in said conduit, comprising a fluid pressure actuated member having a valve opening pressure chamber at one side thereof and a valve closing pressure chamber at the other side thereof, a venturi through which fluid flowing in said conduit is adapted to pass, said venturi having both its intake and discharge means for inducing a flow through connected to said conduit on the downstream side of the valve, means communicating the pressure in said conduit at the upstream side of said main valve to the valve opening pressure chamber, and a connection for communicating the pressure at the throat of said venturi to said valve closing pressure chamber, said venturi being subjected to flow in the main conduit only when said main valve is open.

ROBERT BISCHOFF.

CERTIFICATE OF CORRECTION.

Patent No. 2,168,254. August 1, 1939.

ROBERT BISCHOFF.

It is hereby certified that error appears in the printed specification of the above numbered patent requiring correction as follows: Page 3, second column, lines 20 and 21, claim 4, strike out the words "means for inducing a flow through"; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.